OSCILLATING MECHANISM FOR TENNIS BALL THROWING MACHINE

Original Filed Sept. 5, 1968 3 Sheets-Sheet 1

Fred A. Earle, Jr.
Carl S. Pound
INVENTORS

BY Clarence A. O'Brien and Harvey B. Jacobson
Attorneys

OSCILLATING MECHANISM FOR TENNIS BALL THROWING MACHINE
Original Filed Sept. 5, 1968 3 Sheets-Sheet 2
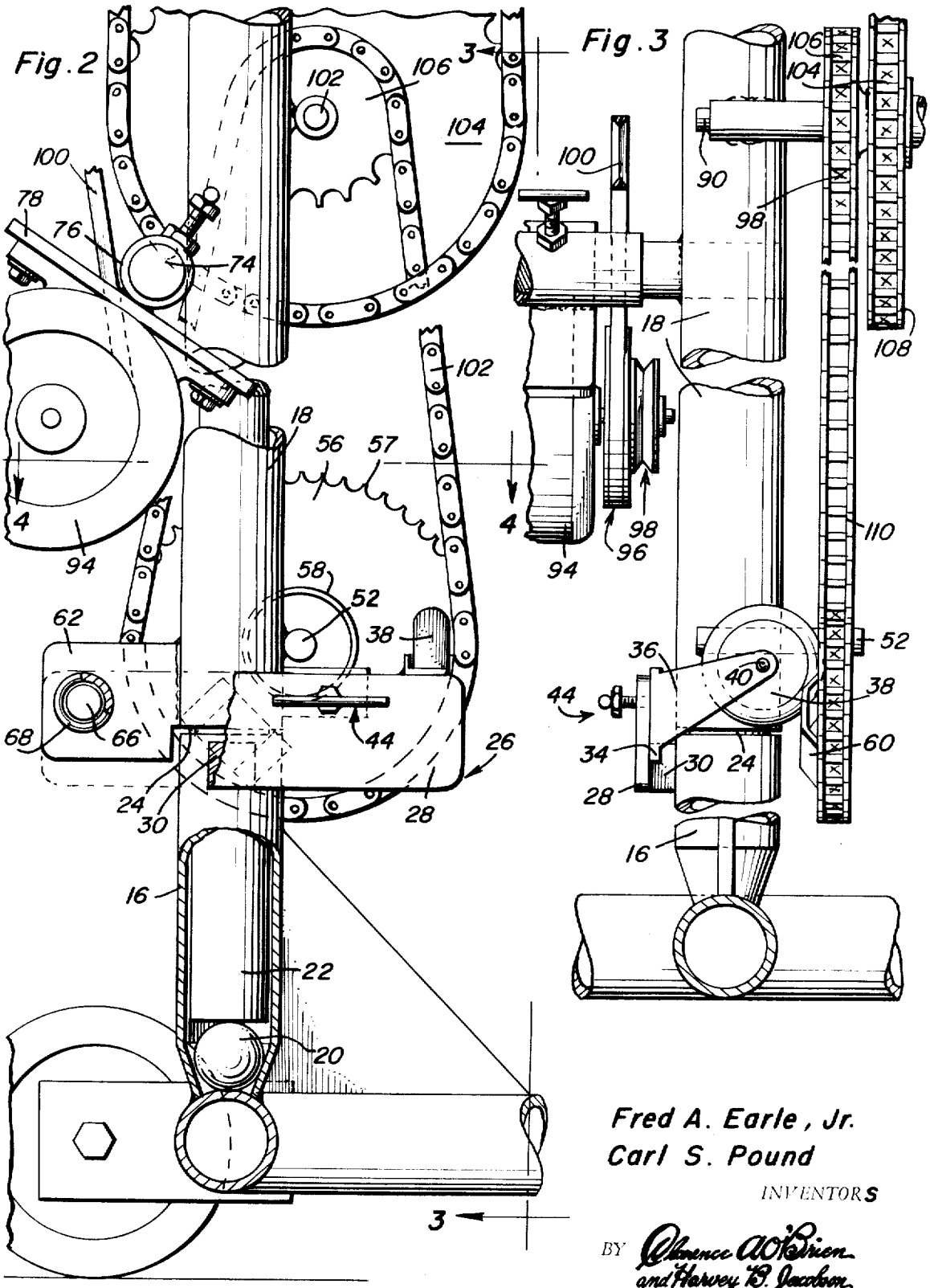
Fred A. Earle, Jr.
Carl S. Pound
INVENTORS
BY Clarence A. O'Brien and Harvey B. Jacobson
Attorneys

OSCILLATING MECHANISM FOR TENNIS BALL THROWING MACHINE

Original Filed Sept. 5, 1968 3 Sheets-Sheet 3

Fred A. Earle, Jr.
Carl S. Pound
INVENTORS

BY Clarence A. O'Brien and Harvey B. Jacobson
Attorneys

United States Patent Office

Re. 28,096
Reissued Aug. 6, 1974

28,096

OSCILLATING MECHANISM FOR TENNIS BALL THROWING MACHINE

Fred A. Earle, Jr., 5001 E. Apache Trail, % 455 Merlin, Mesa, Ariz. 85205, and Carl S. Pound, deceased, late of Modesto, Calif., by Edith L. Pound, executrix, 2900 E. Hatch Road, Modesto, Calif. 95351

Original No. 3,568,653, dated Mar. 9, 1971, Ser. No. 757,671, Sept. 5, 1968. Application for reissue Mar. 9, 1973, Ser. No. 339,650

Int. Cl. F41b *3/04*

U.S. Cl. 124—1 20 Claims

Matter enclosed in heavy brackets [ ] appears in the original patent but forms no part of this reissue specification; matter printed in italics indicates the additions made by reissue.

ABSTRACT OF THE DISCLOSURE

A ball throwing machine having a two-section support including a fixed lower section and a movable upper section which carries the ball throwing mechanism. A motor-driven cam follower assembly is provided on the upper movable section and cooperates with a cam assembly on the fixed lower section so as to bias the rotatable upper section with respect to the fixed section and cause the ball throwing mechanism to move angularly. *The cam follower assembly is spring biased into engagement with the cam assembly. A limit stop is provided to limit the degree of return of the cam follower assembly.*

Heretofore, machines designed to throw tennis balls for the purpose of practicing the return thereof, have been unable to automatically throw the ball at varying angles relative to the previous throw. Those machines that did have the capability to angle the shot had to be done manually prior to the release of each shot, and therefore, required an attendant to angle each shot if such was desired. As a result, unless the machine was attended by someone to angle the shot the machine provided no more variety nor practice than the volleying of a ball against a retaining wall.

The instant invention relates to a device to convert a tennis ball throwing machine to automatically vary each shot by angularly displacing it from the preceding shot. This sequence of varying shots from one side of the court to the other is more nearly an actual simulation of game play than has been heretofore available. The device is easily adapted to any existing tennis ball throwing machine and has a cam and return mechanism therefore which angles each shot relative to the previous shot with any predetermined angle desired. The speed of the camming action is variable to coincide with any speed of ball thrown by the machine. The device therefore, when installed on a tennis ball throwing machine provides a versatility therein which cannot be duplicated in any other training machine.

It is therefore an object of this invention to provide a simple but unique device that automatically varies the angle of a ball thrown by a tennis ball throwing machine.

It is a further object of this invention to provide a device that enables a tennis ball throwing machine to automatically vary the angle of delivery of successive thrown balls from a tennis ball throwing machine.

It is a still further object of this invention to provide a device that automatically angles the successive shots of a tennis ball throwing machine with capability to compensate for the speed of the thrown balls.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a sectional view, on an enlarged scale, taken substantially along the line 2—2 of FIG. 1.

FIG. 3 is a sectional view taken substantially along the line 3—3 of FIG. 2.

Figure 1:
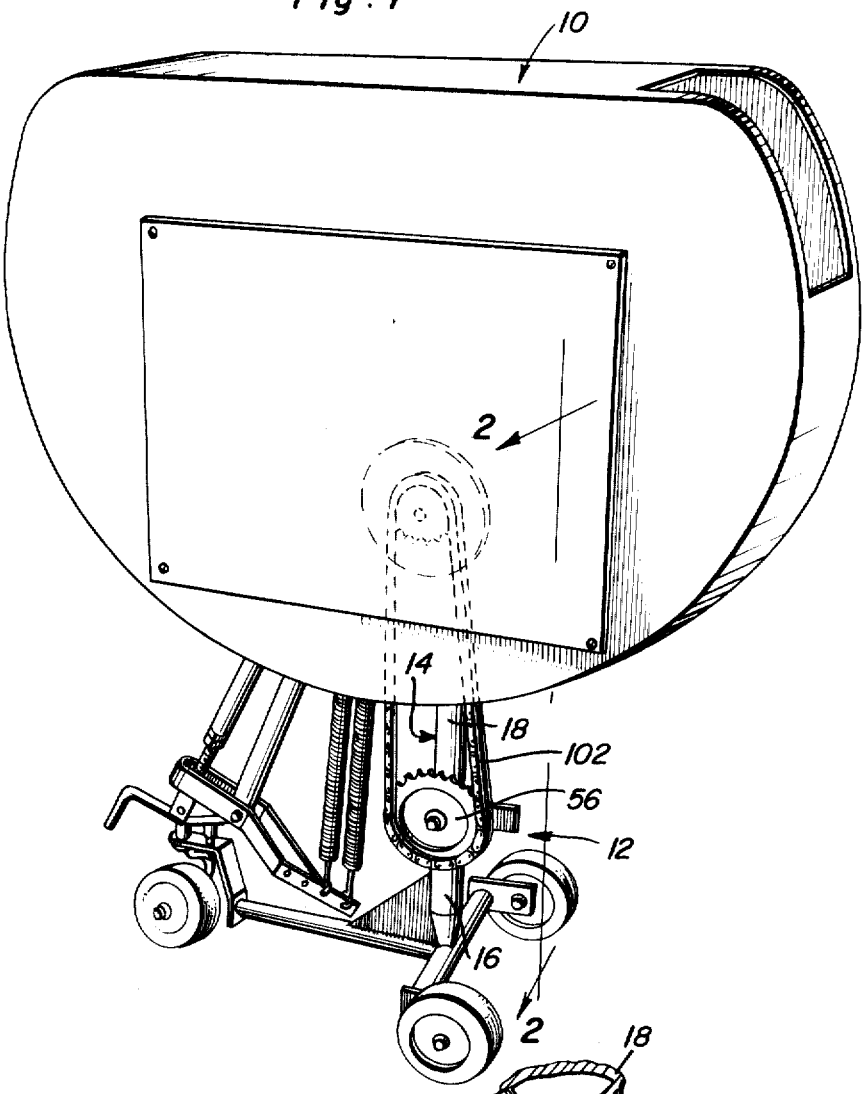
FIG. 1 is a perspective view of the device installed on a tennis ball throwing machine.

Referring now to the drawings the numeral 10 generally designates a conventional tennis ball throwing machine, while numeral 12 designates the oscillating mechanism therefor. The machine 10 can be any one of the conventional tennis ball throwing machines, and as such does not constitute a part of this invention. The installation of the oscillating mechanism 12 requires that the main support shaft 14 be cut in half near the lower end thereof, yielding a lower portion 16 and an upper portion 18. A pivot ball 20 is inserted into the lower portion 16 to rest in the bottom thereof, and a pivot shaft 22 is inserted on top thereof. The outside diameter of the shaft 22 is slightly smaller than the inside diameter of the upper and lower portions 16 and 18 to provide a relatively tight pivotal axis therefor. The pivot shaft 22 extends upwardly into the inside of the upper portion 18 and is fixed thereto, such as by welding, so that the upper portion 18 will be supported on the pivot ball 20 and shaft 22 out of contact with the lower portion 16 as indicated at 24. Thus, the basic swiveling function is provided between the oscillating head of the throwing machine and its base.

A cam assembly 26 is fixed to the lower portion of the main support shaft 16 thereby forming the relatively stationary part of a camming assembly. The cam assembly 26 has a main support plate 28, which is fixed to the lower portion 16 of the main support shaft by a spacer block 30. The main support plate 28 is an elongated rectangular member fastened to the block 30 at its relative midpoint, with a roller assembly 32 mounted at one end. The assembly 32 has a main base block 34 with two parallel extending members 36 thereon. A wheel 38 is journaled for rotation between the members 36 by an axle 40 extending therebetween. Fixed to the opposite ends of the main support plate 28 is a spring retainer abutment 42 to keep the return spring aligned thereon. A cam return adjustment 44 is mounted on the main support plate 28 susbtantially midway between the spacer block 30 and the roller assembly 32. The cam return 44 has a threaded shank 46 which is received in a threaded opening 48 through the plate 28. Thus, the cam assembly 26 is fixed to the lower portion 16 of the main support shaft and therefore to the base of the throwing machine, and is, as mentioned above, the relatively stationary part of the swivel assembly.

Figure 4:
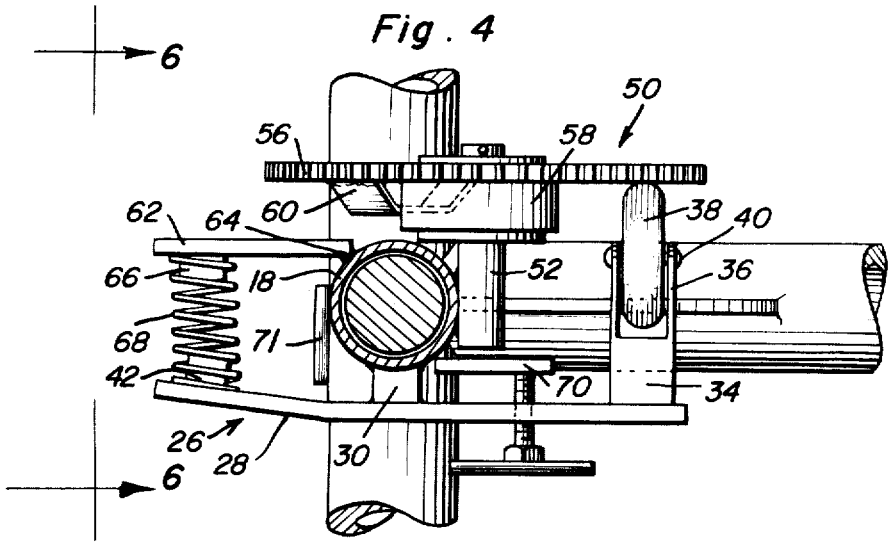
FIG. 4 is a sectional view taken substantially along the line 4—4 of FIG. 2.
Figure 5:
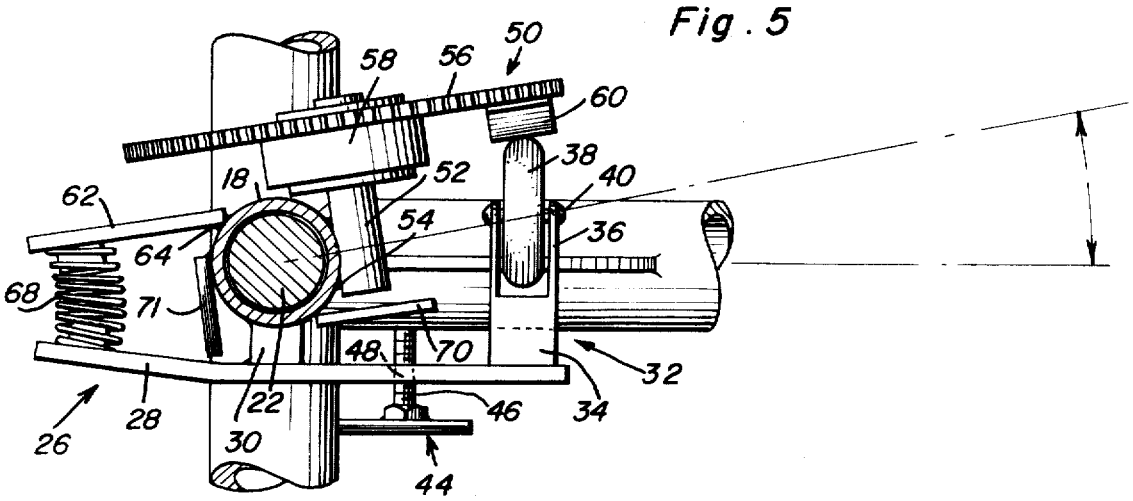
FIG. 5 is a sectional view esseentially the same as FIG. 4 showing the cam on top of the lobe thereby angling the path of the thrown ball.
Figure 6:
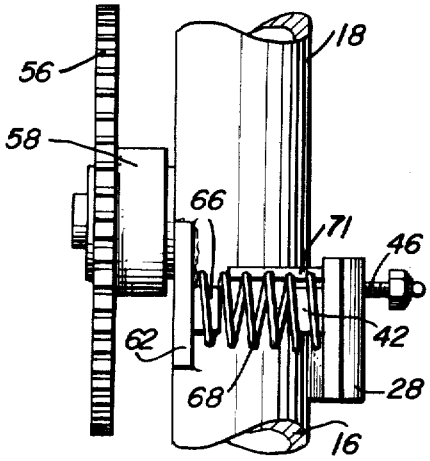
FIG. 6 is a sectional view taken substantially along the line 6—6 of FIG. 4.

The cam follower assembly and drive mechanism 50 is attached to the upper portion 18 of the main support shaft and constitutes the relatively movable portion of the camming assembly. The cam follower assembly 50 has a main shaft 52 fixed to the upper shaft portion 18 in tangential relationship thereto, as by welding, as indicated at 54. The main shaft 52 is fixed on the shaft portion 18 on the side thereof on which the assembly 32 is affixed to the cam assembly. A cam follower sprocket wheel 56 with teeth 57 around the circumference thereof is journaled for rotation on the shaft 52 by a bearing 58 affixed to the center of the wheel 56. The diameter of the wheel 56 is sufficient that when journaled on the shaft 52 the outside or circumference of the wheel extends beyond the wheel 38, so that the wheel 38 may ride on the planar surface of the cam follower sprocket wheel 56. The follower wheel 56 has a ramplike lobe 60 thereon spaced near the circumference thereof to be engaged by the wheel 38. Thus, while the wheel 38 rides on the planar surface of the follower sprocket 56 there is no relative movement therebetween, but when the lobe 60 engages the wheel 38 the upper section of the main support shaft and the elements mounted thereon would be forced to rotate relative to the lower shaft and the cam mechanism attached thereto. A return arm 62 is fixed to the circumference of the upper portion 18 of the shaft, as by welding at 64, to extend in a position substantially parallel to the main support plate 28. A spring retainer abutment 66 is fixed to the free end of the return arm 62 opposite the abutment 42 on the main support plate 28 of the cam mechanism. An elongated coil return spring 68, whose ends fit over and engage the abutments 42 and 66 and are retained thereon, force the support plate 28 and return arm 62 away from each other thereby maintaining the follower and cam in an initial position or returning the follower mechanism and the cam assembly to their initial position, as shown in FIG. 4. To provide an abutment to limit the return of the cam follower assembly to an initial position after the wheel 38 has gone off the lobe 60 an arm 70 is fixed to the circumference of the upper portion 18 of the main shaft in parallel relation to the plane of the sprocket wheel 56 and the return arm 62. The arm 70 is fixed on the same side of the main shaft as the shaft 52 so as to overlie the threaded end 46 of the cam return adjustment 44. In this way the return of the cam follower assembly can be limited by the engagement of the arm 70 with the aforementioned threaded end 46, which adjustment 44 can be advanced to the point where it will hold the follower out of engagement with the wheel 38 and allow continuous volleying or serving in a straight line or be advanced completely out of engagement with the arm 70 whereby the full angular displacement of the cam lobe 60 will take place. A stop 71 is fixed to the circumference of the upper portion 18 of the main support shaft adjacent the return arm 62 in perpendicular relationship thereby. The stop 71 limits the movement of the throwing mechanism when the wheel 38 engages the cam lobe 60 so that inertia thereof will not swivel the mechanism to cause collapse of the return spring 68 and contact between support plate 28 and return arm 62.

Figure 7:
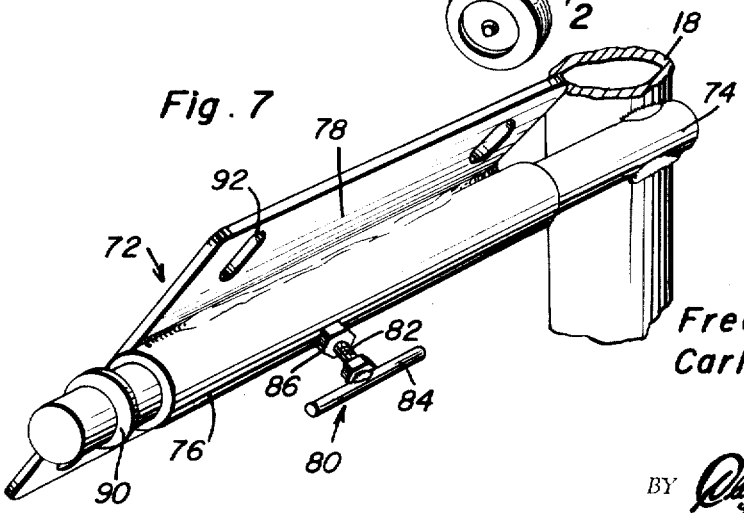
FIG. 7 is an enlarged perspective view of the adjustable motor mount.

The drive for the sprocket 56 is provided by taking power from the throwing machine. As illustrated in FIG. 7, a motor mount assembly 72 has a main support shaft 74 fixed to the circumference of the upper portion 18 of the main support shaft. A sleeve 76 whose inside diameter is slightly larger than the outside diameter of the support shaft 74 is mounted thereon and has a motor support plate 78 attached to the circumference thereof. The motor support plate is fixed in any relative position to the support shaft 74 by an adjustment assembly 80 which includes an elongated threaded shaft or setscrew 82 with a handle 84 thereon to facilitate tightening the threaded shaft or setscrew 82 sufficiently to hold the motor support. The threaded shaft is engaged in nut 86 which is welded to the circumference of the sleeve 76 to cooperate with a threaded opening 88 therein so that the threaded shaft 82 extends through the nut 86 and the opening 88 in the wall of the sleeve 76 to engage the main shaft 74. A collar 90 is affixed to the shaft 74 near the free end thereof to prevent inadvertent removal of the motor mount assembly 72 from the shaft 74. The motor support plate 78 is provided with elongated slots 92 to provide for adjustment of the motor across the width of the plate as well as the rotational adjustment about, and longitudinal adjustment along, the shaft 74.

A motor 94 is mounted on the motor support plate 78 with two V-belt pulleys 96 and 98 mounted on the drive shaft thereof. The V-belt 100 takes the power from either of the pulleys 96 and 98 and drives the throwing mechanism. Therefore by extending the V-belt 100 around either pulley 96 or 98 the speed of the throwing machine can be varied. The V-belt pulleys 96 and 98 are brought into alignment for use with the V-belt 100 by moving the motor mount assembly along the motor mount support shaft 94 to align the proper pulley, depending upon the speed of the throwing mechanism desired, with the V-belt 100. A shaft 102 is journaled for rotation on the upper portion 18 of the main support shaft and has two sprockets 104 and 106 fixed together and mounted thereon for simultaneous rotation, with the larger sprocket 104 a part of the original throwing machine, and therefore geared down to the desired speed, with the smaller sprocket 106 attached thereto. A chain 108 goes around the original sprocket 104 and drives it from the throwing machine, thereby driving the sprocket 106 which in turn drives the sprocket 56 by a chain 110 which extends around the sprockets 56 and 106.

As mentioned hereinabove, when the speed of the serve is increased by using the large V-belt pulley to drive the throwing machine, the speed of the oscillation of the mechanism is increased accordingly, since the mechanism is driven by the chains 108 and 110 from the mechanism and each serve will be launched first in the straight ahead position and the next serve will be released when the cam wheel 38 has engaged the lobe 60 to deflect the serving machine. Thereby successive serves will be angulary displaced relative to one another.

As mentioned hereinabove, the motor 94 is the main drive motor of the ball throwing mechanism and is fixed to the upper portion 18 of the main support shaft with the follower mechanism so that the entire drive assembly with the chains and follower would rotate about the vertically extending main support shaft. The operation of the mechanism then is readily apparent, since the mechanism will operate when the machine is in use. The sprocket 104 or 106 rotates the sprocket 56 thereby periodically bringing the cam lobe 60 into contact with the cam wheel 38. The size of the sprocket 106 and the sprocket 56 is chosen so that two tennis balls are thrown for each rotation of the sprocket 56, thereby launching one ball in a straight ahead position and the other ball on the deflected position when the cam wheel is on the surface of sprocket 56 and on top of the lobe 60, respectively. By adjusting stop member 46, the degree of angular displacement of the path of travel of the ball may be adjusted, thus requiring a player using the device to take a single lateral step or any number of steps to return successive balls. The invention as above set forth is a simple modification to an existing machine or is easily incorporated into a new article of manufacture. The invention thus is a simple but unique device to be incorporated in the tennis ball throwing machine which greatly improves the training that can be obtained through its use.

We claim:

1. In a ball throwing machine, an upright support member, a *ball* throwing mechanism on the upper portion of the support member, said support member having first and second vertically aligned spaced-apart sections, a swivel connection inserted between and connecting said first and second sections, said first section being fixed and said second section being rotatable, a cam assembly fixed to said first section, a cam follower assembly fixed to said second section, and means for moving said cam follower assembly with respect to the cam assembly so that the latter will react with the cam follower assembly and cause relative horizontal movement between the first and second sections of said support and a horizontal movement of the *ball* throwing mechanism.

2. The device of claim 1 wherein the swivel connection comprises a tube inserted in the first and second sections of said support member in telescoping relationship therewith and being fixed to said second section and an antifriction device positioned at the end of the tube between the tube and the bottommost end of the first section.

3. The device of claim 1 wherein the cam assembly comprises an elongated support plate fixed at a point intermediate ends to said first section of said support member between the ends of *said first section,* [thereof] and a wheel journaled for rotation on one end of said support plate.

4. The device of claim 3 wherein said cam follower assembly includes an axial disc cam follower journaled for rotation on said second section of said support so that the surface thereof adjacent the circumference will engage the cam assembly [wheel].

5. The device of claim 4 having means acting between said sections to bias the follower disc into engagement with the cam *assembly* [wheel surface].

6. The device of claim 5 wherein said means acting between said sections is a spring acting between the other end of the elongated support plate and an abutment on said second section of said support *member.*

7. The device of claim 6 wherein further means act between said elongated support plate and said second section of said support to limit the biased movement between said cam assembly and *said* cam follower assembly.

8. In combination, a ball throwing machine having a base, an upright support fixed thereto, a *ball* throwing mechanism supported on the upper portion of said support in spaced relation above the base, the support including a first section fixed to the base and a second upper vertically aligned section fixed to the *ball* throwing mechanism, a swivel joint between and connecting said first and second sections for allowing movement of the second section relative to the first section, a cam follower assembly affixed to one of said sections and a cam assembly fixed to the other of said sections whereby the reaction between the cam assembly and cam follower assembly, *when the latter is rotating,* will move the second section relative to the first section thereby angularly displacing the trajectory of a ball thrown by the mechanism.

9. The device of claim 8 wherein said support is tubular and the swivel joint comprises a tube inserted in the tubular support in telescoping relationship therewith and being fixed to said second section and an antifriction device positioned at the end of the tube between the tube and the bottommost end of the first section.

10. The device of claim 8 wherein the cam assembly comprises an elongated support plate fixed at a point between its ends to said first section of said support and *having* a wheel journaled for rotation on one end of said support plate.

11. The device of claim 9 wherein said cam follower assembly includes an axial disc cam follower journaled for rotation on said second section of said support so that the surface of said disc adjacent the circumference thereof will engage the wheel.

12. The device of claim 11 having means acting between said first and second sections to bias the cam follower disc into engagement with the cam wheel.

13. The device of claim 12 wherein said disc surface has one projection thereon to be engaged by said cam wheel.

14. The device of claim 13 wherein further means act between said elongated support plate and said second section of said support to limit the biased movement between said cam assembly and cam follower assembly.

15. The device of claim 14 including a drive means to rotate one of said assemblies.

16. The device of claim 15 wherein said drive means includes a motor fixed to said second section in spaced relation to said cam follower assembly and means interconnecting said motor and said cam follower assembly to rotate said cam follower assembly.

17. The device of claim 16 wherein the means interconnecting the motor and cam follower assembly includes a chain received around teeth on the circumference of said cam follower assembly and a sprocket driven by said motor.

*18. In a ball throwing machine the improvement comprising:*

*A. a base frame;*

*B. means including a vertically oriented, elongated support member fixed to said frame having a first section and a second section disposed above and in substantial vertical alignment to said first section, said first section being rigidly fixed to said frame and supported against motion relative thereto;*

*C. a ball throwing mechanism supported by said support member and rigidly fixed to said second section so as to be movable in unison with movement of the second section;*

*D. coupling means mounted on said first section for supporting said second section for oscillatory motion about a substantially vertically oriented axis coincident with the vertically oriented axis of symmetry for said first section; and*

*E. drive means connected to said support member for imparting to said second section oscillatory motion about said substantially vertical axis.*

*19. The improvement of claim 18 wherein said drive means includes a drive train comprising a means which is moved during rotation of the drive train to cause oscillatory motion of the second section to oscillatory motion.*

*20. The improvement of claim 18 wherein said drive means includes a cam assembly mounted on said first section, a cam follower assembly mounted on said second section in coacting engagement with said cam assembly, said oscillatory motion being imparted to said second section in response to a coaction of said cam follower assembly with said cam assembly.*

References Cited

The following references, cited by the Examiner, are of record in the patented file of this patent or the original patent.

UNITED STATES PATENTS

| | | | |
|---|---|---|---|
| 2,666,424 | 1/1954 | Foster | 124—9 |
| 1,030,852 | 6/1912 | Huntley | 124—9 |
| 1,403,151 | 1/1922 | Diehl | 74—25 |
| 2,441,053 | 5/1948 | Wooster | 74—25 X |
| 3,277,879 | 10/1966 | Sayette | 124—26 |

RICHARD C. PINKHAM, Primary Examiner

W. R. BROWNE, Assistant Examiner

U.S. Cl. X.R.

273—26 D